United States Patent [19]

Hockler

[11] 4,011,434
[45] Mar. 8, 1977

[54] STAND-ALONE CUMULATIVE ELAPSED-TIME CALCULATING SYSTEM

[75] Inventor: Norman N. Hockler, Galion, Ohio

[73] Assignee: North Electric Company, Galion, Ohio

[22] Filed: Aug. 25, 1975

[21] Appl. No.: 607,495

[52] U.S. Cl. ..................... 235/61.9 R; 235/61.6 R
[51] Int. Cl.$^2$ ..................... G06K 1/00; G06K 7/10
[58] Field of Search ............... 235/61.9 R, 61.11 D, 235/61.12 R, 61.12 M, 61.6 J, 61.6 R; 346/20, 53, 59, 82

[56] References Cited

UNITED STATES PATENTS

| | | | |
|---|---|---|---|
| 3,241,151 | 3/1966 | Logie et al. | 235/61.9 R |
| 3,626,380 | 12/1971 | Griffin | 235/61.9 R |
| 3,648,243 | 3/1972 | Wiggins | 235/61.9 R |
| 3,806,705 | 4/1974 | Reilly et al. | 235/61.9 R |
| 3,894,215 | 7/1975 | Lotter et al. | 235/61.9 R |
| 3,932,730 | 1/1976 | Ambrosio | 235/61.9 R |

Primary Examiner—Vincent P. Canney
Attorney, Agent, or Firm—Johnson, Dienner, Emrich & Wagner

[57] ABSTRACT

A system for elapsed-time calculation is disclosed. The system employs a magnetic-striped card in conjunction with a stand-alone terminal for recording the coming and going of employees, along with other pertinent payroll data, directly on the magnetic strip. The elapsed-time calculation is cumulative, thereby allowing an employee to maintain a flexible work schedule and to receive credit for all time worked during a given pay period. The system features visual feedback to the employee whenever his card is used, so as to inform him of both the total time he has accumulated over the pay period and elapsed time for the most recent period worked. Further features include the elimination of large-scale terminal and/or remote computer memory, hard-copy back-up in case of system failure, and recyclable time cards.

18 Claims, 4 Drawing Figures

FIG.-1B

LOCATION

| | A | B | C | D | E |
|---|---|---|---|---|---|
| W | EMPLOYEE NO. | CUMULATIVE HOURS | LAST TRANSACTION TIME | IN/OUT | JULIAN DAY |
| | XXXXXXXXX | XX.XX | XXXX | X | XXX |

| | | | | | |
|---|---|---|---|---|---|
| X | EMPLOYEE NO. | CUMULATIVE HOURS | LAST TRANSACTION TIME | IN/OUT | JULIAN DAY |
| | 123456789 | 00.00 | 0000 | 0 | 000 |

| | | | | | |
|---|---|---|---|---|---|
| Y | EMPLOYEE NO. | CUMULATIVE HOURS | LAST TRANSACTION TIME | IN/OUT | JULIAN DAY |
| | 123456789 | 00.00 | 0800 | 1 | 123 |

| | | | | | |
|---|---|---|---|---|---|
| Z | EMPLOYEE NO. | CUMULATIVE HOURS | LAST TRANSACTION TIME | IN/OUT | JULIAN DAY |
| | 123456789 | 02.00 | 10.00 | 0 | 123 |

FIG.-2

STAND-ALONE CUMULATIVE ELAPSED-TIME CALCULATING SYSTEM

BACKGROUND OF THE INVENTION

1. Field of the Invention

The invention relates generally to systems for computing and recording elapsed time. More particularly, the invention relates to systems for accumulating elapsed time.

2. Background of the Invention

According to well-known practices, time clocks are widely employed to obtain a printed record of the time a worker spends on his job to thereby determine the amount of his pay, dependent on the hourly rate at which he is to be paid. With the usual time clock, the worker "punches" or "rings" in and later punches out when entering and leaving his work area. The times for punching in and punching out are printed on the time card or some sort of recording sheet. From this time card, those responsible for paying the worker first compute the number of hours which have been worked in a given pay period and then compute the amount of the pay for such a period.

Over the years, a great number of time clocks have been conceived and made commercially available, with various objects in mind. Among such prior time clocks and with particular reference to certain aspects of the present invention, is the so-called "elapsed time" time clock which provides not only an indication of the times of arrival and departure but also automatically indicates the amount of time a worker has spent on the job. The advantages of such a time clock are obvious since it is no longer necessary to compute the time the worker has been on the job as a preliminary step to determining the amount of pay he is to receive.

Prior art elapsed-time time clocks have been limited as to the extent they have been used because of the complexity of their design and also because they have in many instances been limited to printing but a single elapsed-time reading on a given time card corresponding to the time between a single entry/exit pair of inputs.

With the advent of digital computers, time recording systems have evolved wherein the input and output times for each employee are stored within the computer memory along with other data such as the employee's hourly rate of pay. At the end of the pay period, the stored data is reduced and translated into a paycheck for the employee.

Recent elapsed-time calculating systems generally employ a remote digital computer for receiving inputs from a plurality of time recordation stations. This allows for one central memory and one central processor; in stand-alone systems, a processor and a memory would have to be associated with each time recordation station. A significant prior art problem is the need for expensive computer memory, whether located at each terminal or located remotely. Additionally, these prior art systems are not suitable for allowing a "flexible" work schedule, defined herein to be a schedule where an employee may enter and leave as he pleases so long as he accumulates at least a minimum number of hours per week. This flexible scheduling is hereinafter referred to as a "flex-time" schedule.

In addition to the memory expense problem referred to above with reference to elapsed-time time clocks in general, another reason for the prior art failure to cope with flex-time scheduling is the need for employees to know on demand where they stand with respect to the number of hours accumulated during a given pay period. This is important so that the employee will know when he has fulfilled his work obligation over the pay period. In systems where data is reduced once per pay period, usually at the end of the period, the employee has to keep track of his time manually. To run a data reduction at more frequent intervals, over what is usually a large payroll data base, would be both time-consuming and expensive.

Still another problem in the prior art time-keeping technology is the use of cards on which is printed employee time information. These cards provide back-up information for what is fed into the computer or in non-computer-oriented systems are actually the time records relied upon for accounting purposes. The cards do not lend themselves for any further use in time recordation after a given pay period has expired since they are either punched or printed on.

It is an object of this invention to eliminate the substantial computer memory required with either of the stand-alone and/or remote computation operations associated with elapsed-time recording.

It is a further object of this invention to provide a time recordation system particularly well suited for use where flex-time scheduling is permitted, providing on-demand reporting of accumulated time.

It is still a further object of this invention to provide for card recycling.

SUMMARY OF THE INVENTION

According to the invention, a magnetic-striped card is employed in conjunction with a stand-alone terminal for recording directly on the magnetic strip the coming and going of employees, along with other pertinent payroll data. The elapsed-time calculation is cumulative, thereby allowing the employee to maintain a flexible work schedule and to receive credit for all time worked during a given pay period.

Whenever an employee enters or leaves any work facility and passes a time recordation station, he is instructed to insert his magnetic-striped card into a stand-alone terminal. The magnetic-striped card is used to maintain a record of the employee's time worked over a given pay period.

According to the preferred embodiment of the invention, the card has recorded on the magnetic strip in a first location the employee's employee identification number. Other locations are provided to hold information such as, but not limited to, cumulative hours, last transaction time, nature of last transaction (in or out) and Julian day. Two cards encoded with the employee's clock number may be assigned to each employee. A given card is to be used during alternate pay periods.

Prior to the beginning of a given pay period, the employee is issued the card which was not in use during the previous pay period and which has been run through an administrative terminal which resets all the fields, except the employee identification number, to 0. When the employee uses the card on the first day of the pay period, this first use must be an "in" transaction. After such use, the time of the in and the in code is written on the appropriate location of the card. The employee continues to utilize this card for each entry and exit to and from the work facility over the pay period. With each transaction, the employee number, cumulative hours worked, last transaction time, nature of transaction (in or out), and Julian day of the last transaction are all to be displayed to the employee.

The system is also operative to accumulate time where the employee arrives on one day and leaves the next day. For example, if the employee arrives at 11:00 p.m. on one day and leaves at 8:00 a.m. in the morning on the following day, since the Julian day of the original in transaction was recorded on the card, the cumulative hours must automatically be adjusted to take care of the fact that the employee arrived one day but left the next.

The system is also operative to detect an incorrect transaction selection by employee. For example, should the employee depress the wrong button upon passing the recordation station, i.e., depress the in button on his way out or depress the "out" button on his way in, the transaction would automatically be rejected and the employee notified of the incorrect selection. This "rejection" takes place whenever the current transaction attempted is not the opposite of the type of transaction previously recorded on the card.

At the end of the pay period, the employee's card is collected. The alternate card is issued to the employee just prior to the end of the pay period so that he will have a "clean" card for the upcoming pay period.

The collected card, containing the cumulative hours for the employee, is put through a data reduction terminal which reads the employee number and the cumulative hours credited. This data, according to the preferred embodiment, may be matched for validation purposes against dates which may be recorded on an internal cassette recorder optionally located at each terminal. This may be done for the purposes of preventing fraud.

The invention features visual feedback to the employee whenever his card is used so as to inform him of total time accmulated throughout the pay period.

Further features include hard-copy back-up in case of card damage and the reusability of the magnetic-striped cards during alternate pay periods.

DETAILED DESCRIPTION

Figure 1A:
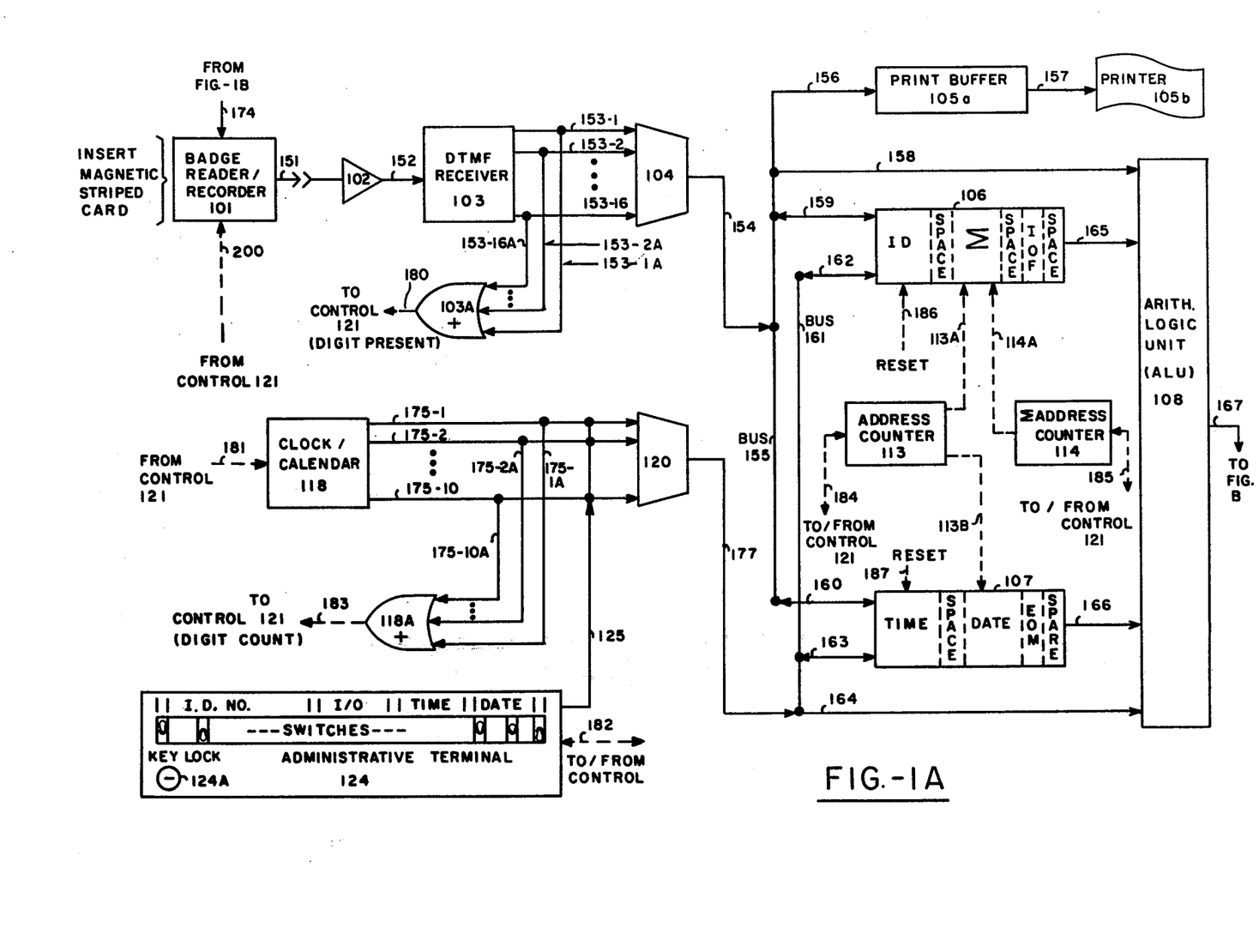
FIG. 1A and FIG. 1B, combined, display an illustrative embodiment of a stand-alone cumulative elapsed-time calculating system built in accordance with the principles of the instant invention.
Figure 1B:
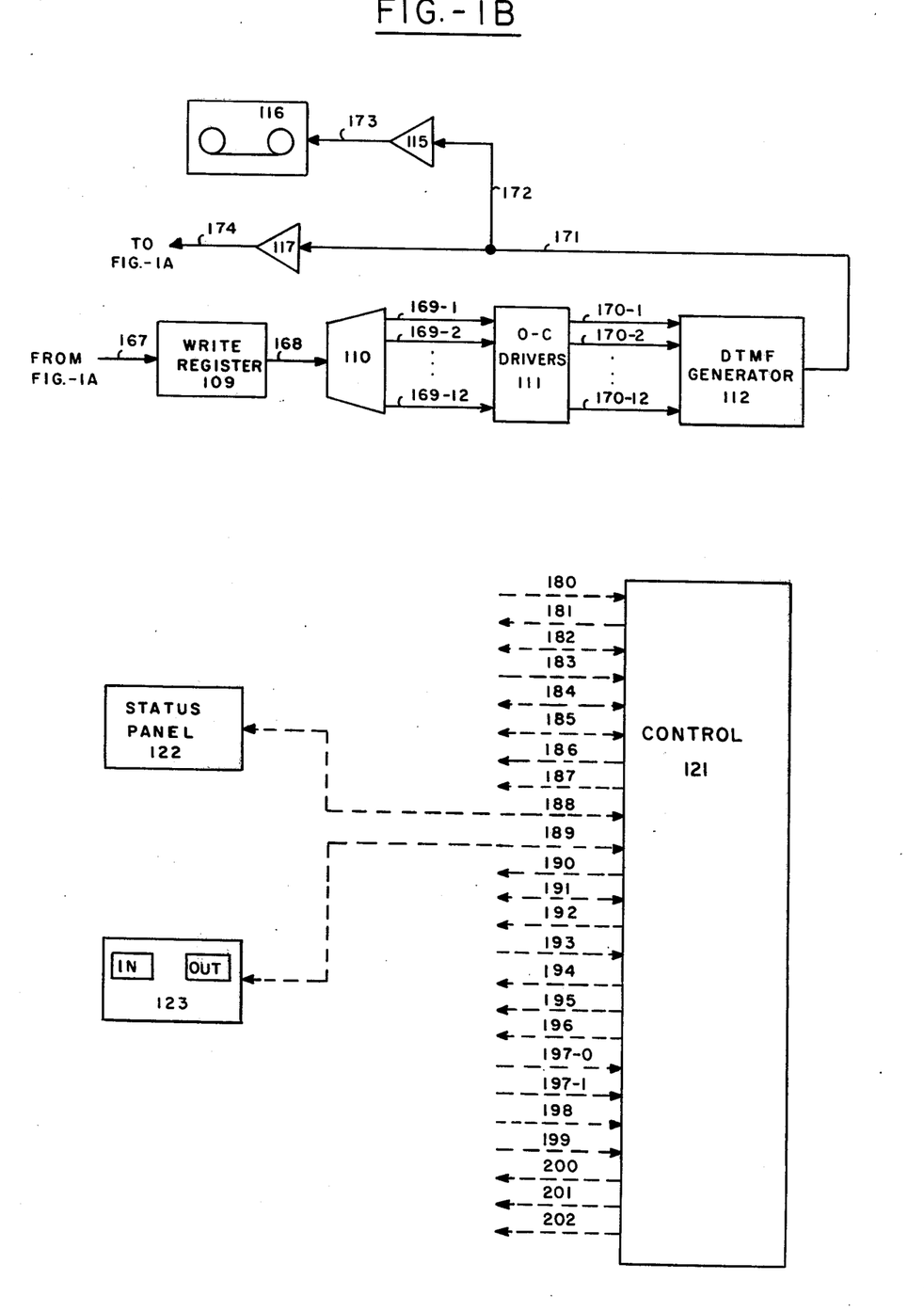

FIG. 1A, taken together with FIG. 1B, as indicated above, displays an illustrative embodiment of a suitable structure for effecting the instant invention.

Referring first to FIG. 1A, a badge reader/recorder, unit 101, shown in the upper left-hand portion of the figure, receives input from a magnetic strip on a card inserted into the unit. The process of time recordation actually begins when an employee inserts his magnetic striped card into unit 101. It is assumed that the employees have been instructed to insert their cards into the badge reader/recorder whenever passing a time recordation station in the course of entering or leaving the work facility.

For the sake of illustration only and without limiting the invention, it will be assumed that the data recorded on the magnetic strip is in the form of dual tone multi-frequency (DTMF) tones wherein a pair of tones is uniquely associated with a numeric or control character. U.S. Pat. No. 3,757,089, issued in the name of the applicant is hereby incorporated by reference to describe the generation and detection of DTMF signals.

Whether an in or out transaction is in process, the data from the magnetic strip is to always be input to the system initially. The data is then processed in accordance with the in and out function requirements which correspond to a first and second control sequence for processing respectively, the details of which are set out hereinafter. Finally, the employee's card (the strip) is modified to indicate the nature and time of the last transaction as well as to maintain a record of the time the employee has accumulated on the job.

Furthermmore, once the card is modified, the new information on the strip is verified for accuracy and the employee's card is then finally released.

Only in the case of an error will there be a deviation from the above-stated sequence of operations. Error conditions and responses will also be set out in detail hereinafter.

Before returning to the detailed description of the system displayed in FIG. 1A and FIG. 1B, it should be noted that the solid lines in FIG. 1A and FIG. 1B represent data paths; whereas the dashed lines, for the sake of clarity, represent control paths and pointers to specific register fields. Each data link, control path or pointer will be described as to its particular function in the course of the discussion below.

As indicated above, the tones recorded on the magnetic strip are read by unit 101 during both the input and a verification process. After each tone is read serially off the strip by unit 101, the tone is sent, via link 151, to amplifier 102 where the tone is amplified prior to being input, via link 152, to DTMF receiver 103.

According to the preferred embodiment of the invention, there are 16 possible input characters, the 10 digits 0 – 9, an "end of message" character, a "space" character and 4 spare characters. The number of possible characters may, of course, be varied to suit the needs of the user.

Receiver 103 enables one of 16 links, shown as links 153-1 through 153-16, depending on the particular tone received. The enabled link in turn causes a reliability link, uniquely associated with the enabled link, to become energized. The reliability links are sown as links 153-1A through 153-16A of FIG. 1A. These links are used to pass a signal to control 121 whenever a tone is input so that control 121 (of FIG. 1B) may later check to see if the total expected number of tones has been received from the card. "OR" gate 103A may be seen to supply the "digit present" information to control 121 via control link 180.

To this point, we have each of the serially-input digital tones resulting in one of the links 153-1 through 153-16 being energized. Links 153-1 through 153-16 terminate at unit 104 which is a binary coded decimal (BCD) encoder.

According to the preferred embodiment of the invention, one of 16 4-bit BCD characters is uniquely associated with each of the 16 input links to unit 104. Thus, for example, whenever link 153-2 is enabled, a predetermined 4-bit BCD character will be generated by unit 104.

The BCD output of unit 104 is shown in FIG. 1A as being channeled to printer 105B via links 154, bus 155, link 156, print buffer 105A and link 157. Additionally, for purposes to be explained hereinafter, the characters (1) may be channeled to arithmetic logic unit (ALU) 108 via link 154, bus 155 and link 158; (2) may be channeled to register 106 via link 154, bus 155 and link 159; and (3) may be channeled to register 107 via link 154, bus 155 and link 160.

FIG. 1 goes on to depict a clock/calendar unit shown as unit 118 which serially generates digits corresponding to the date and time of a given transaction. These digits are generated upon commmand from control 121, the command being given via control link 181.

The digits generated by clock/calendar 118 cause one of links 175-1 through 175-10 to become energized. Alternatively, one of links 175-1 through 175-10 may also be energized manually by setting the switches on an administrative terminal shown in FIG. 1A as administrative terminal 124. Each switch on terminal 124, according to the preferred embodiment, has 10 positions and the values set on each of the switches may be serially input via link 125 to energize one of links 175-1 through 175-10. The purpose of the administrative terminal will be explained in greater detail hereinafter. It should be noted, however, that terminal 124 is under the control of unit 121, via control link 182, and that the administrative terminal is not to be used in the nominal time recordation process. Terminal 124 is employed to generate new time cards, recycle old time cards for use in subsequent pay periods or to replace lost, stolen or damaged cards. Terminal 124 may also be employed to modify any information on an employee's card as is deemed necessary by management. FIG. 1A displays a key-lock unit 124A incorporated in the administrative terminal so that only management will have access to the terminal. It should be further noted that as to any one time recordation station the interconnection of an administrative terminal is purely optional and is not required for elapsed time or cumulative time processing.

Reliability links 175-1A through 175-10A may be seen connected to links 175-1 to 175-10 respectively. These reliability links serve to inform control 121 whenever a digit is generated by clock/calendar 118. A digit generated by clock/calendar 118 will cause one of links 175-1 through 175-10 to become energized and will cause the corresponding reliability link to become energized. The reliability links are connected to OR gate 118A. A signal will be sent to control 121 via OR gate 118A and control link 183 whenever the clock/calendar unit generates a digit. Control 121, via control link 181 will cut off the time digit generation once the total number of digits corresponding to a complete data and time has been generated.

Each of links 175-1 thorugh 175-10 terminates at BCD encoder 120 which, like encoder 104, generates a distinct BCD character of four bits for each input link which may be energized. The serial four-bit per character output from unit 120, (1) may be stored in register 106 via link 177, bus 161 and link 162; (2) may be stored in register 107 via link 177, bus 161 and link 163 and (3) may be input to ALU 108 via links 177 and 164.

FIG. 1A goes on to depict a plurality of fields in each of registers 106 and 107. Register 106 comprises an "ID" field which, according to the preferred embodiment of the invention, comprises a nine-digit (36-bit) employee ID number (like Social Security number), a 4-bit digit (16-bit) cumulative time field, represented by the Greek letter sigma in register 106 of FIG. 1A, for temporarily storing the amount of time an employee has accumulated at the time of a given transaction, and a one-character (4-bit) in/out field, shown as "IOF" in FIG. 1A, for indicating whether the last transaction was an entrance or exit from the work facility.

Register 107 comprises a four-character (16-bit) time of day field with the least significant character being defined, according to the preferred embodiment, in hundredths of an hour, and a three-character (12-bit) date field for recording the Julian day on which the transaction is taking place (day 001 through day 365). Register 107 also has a location for storing the "End of Message" (EOM) character appearing at the end of the data on each employee's card.

The specific characters in each of the fields of registers 106 and 107, referred to above, may be modified or read. Address counter 113 serves as a pointer to the specific character being examined or modified and counter 113 must have a range sufficient to address any character in either of registers 106 or 107. Address counter 113 is shown via control link 184. Links 113A and 113B are representative of address counter 113 serving as a character pointer as indicated above. Also depicted in FIG. 1A is counter 114 which serves to point to specific characters in the cumulative time field of register 106. Unit 114 may be observed as pointing into the "sigma" field via pointer 114B and may also be seen to be under the control of control unit 121 via control link 185. Registers 106 and 107 may also be initialized (or reset) by control 121 via control links 186 and 187 respectively. Links 165 and 166 of FIG. 1A are direct input paths to ALU 108 from registers 106 and 107 respectively.

Finally, FIG. 1A depicts ALU 108, the logic of which is set out in detail and explained hereinafter with reference to FIG. 3.

FIG. 1B shows the remainder of the structure necessary, according to the preferred embodiment, to implement the invention. In particular, the output from ALU 108, shown as link 167 on both of FIGS. 1A and 1B, is shown input to write register 109. Write register 109 is in turn connected via link 168 to BCD decoder 110 which will energize one of 12 links shown as 169-1 through 169-12, depending on the BCD character input via link 168. Each possible BCD character for output is uniquely associated with one of the 12 output links from decoder 110.

Unit 111 is an oscillator-control driver unit which will cause dual tone multifrequency generator 112 to output a tone uniquely associated with each of the enabling links 170-1 through 170-12. Again, the details of dual tone multifrequency generation are set forth in U.S. Pat. No. 3,757,089 previously incorporated herein by reference. It should be noted that links 170-1 through 170-12 and links 169-1 through 169-12 are in one-to-one correspondence.

The output of dual tone multifrequency generator 112 may be recorded on cassette recorder 116, arriving at the recorder via links 171, 172, amplifier 115 and link 173.

Finally, the output of generator 112 is sent to badge reader/recorder 101 via link 171, amplifier 117 and link 174 thereby closing the system loop. The input to badge reader/recorder 101 via link 174 is recorded on the magnetic strip of the card lodged in the terminal, said card being the vehicle which initiated the transaction.

Figure 1B also depicts the details of control 121, to be further described hereinafter, along with all of the control links from and to FIG. 1A. This group of links is depicted to indicate the means for accessing control 121 and the means by which control 121 may respond whenever necessary.

A status panel, unit 122, is also shown connected to control 121. The purpose of the panel is to display error indicators etc. and is shown connected to control 121 via control link 188. Furthermore, the in and out transaction selection buttons, one of which the employee is to select prior to each transaction, are also shown as connected to control unit 121. The input from these buttons is provided via control link 189.

Each of the components depicted in FIG. 1A and 1B are commercially available as "off the shelf" items. In particular, a badge reader/recorder, unit 101, suitable for use in accordance with principles of the invention is manufactured by ELCOM Industries, Inc., St. Louis, Mo. A read amplifier suitable for use in accordance with the principles of the invention is shown in the player section of the "Telex Corporation Service Manual for Cassette Recorder/Player", manual number 38108-098 published May, 1972 by the Telex Corporation Communications Division, Minneapolis, Minn. DTMF Receiver 103 may be realized by a PECO 7410 receiver manufactured by North Electric Company of Galion, Ohio.

Encoder 104 may be realized by two 74148 diode matrix packs. Print buffer 105A and printer 105B are commercially available as a PECO 7471 printer and buffer combination manufactured by North Electric Company. Registers 106 and 107 are commercially available 7489 register units. Address counter 113 and sigma address counter 114 may be realized by commercially available 74193 counters. Clock/calendar 118 may be realized by a PECO 7449 manufactured by North Electric Company. Administrative terminal 124 may be implemented with a commerically available 28031 lever switch manufactured by DIGITRAN of Pasadena, California. Write Register 109 may be realized by a 74174 register. BCD decoder 110 may be realized by a commercially available 74154 pack. BCD encoder 120 may be realized by a commercially available 74147 unit. OC driver 111 may be realized by two 7407 IC packs. DTMF generator 112 is taught in detail in U.S. Pat. No. 3,757,089 previously incorporated by reference. Recorder 116 may be realized by a Telex Corporation 612 recording unit. Record amplifiers 115 and 117 suitable for use in accordance with the invention are shown in the recorder section of the "Telex Corporation Service Manual for Cassette Recorder/Player" referenced above.

It should be noted that the ELCOM badge reader/recorder 101 has a dual purpose head. The head may be used to extract data from the magnetic strip on the card inserted in the unit and may also be used to record or modify data on the magnetic strip. Thus, the function of the head in unit 101 is switchable. According to the preferred embodiment, the head is under the control of control unit 121 with control being exercised via link 200.

Control unit 121 may be realized by the commercially-available INTEL 8080 microprocessor. In particular, a suitable 8080 configuration for use in conjunction with the instant invention is depicted on page 23 of INTEL "8080 MicroComputer Systems Manual" published January, 1975 by INTEL Corporation, Santa Clara, Calif.

The programming of the 8080 or any similar microprocessor to perform the various control functions specified herein, such as updating counters, lighting lights on a status panel, etc. are believed to be obvious to those of ordinary skill in the art. However, the processing required to perform the actual elapsed time calculations, cumulative time updating, signaling error conditions, etc. is believed to require detailed description. These functions have been taken out from control 121 and suitable logic for performing these functions is shown as a separate block in FIG. 1A, namely, ALU 108. The details of ALU 108 will be set out in detail hereinafter with reference to FIG. 3.

What has been described above with reference to FIGS. 1A and 1B are the details of a structure capable of supporting flexible time schedule processing.

At this time, a description of how the in function control sequence is actually performed will be set out. Reference should be made to the equipment depicted in FIGS. 1A and 1B during this description. Since the out function requires an understanding of the details of ALU 108, a discussion of the out function will be deferred until after the discussion of FIG. 3. In addition, to further an understanding of the in function, reference should also be made to FIG. 2 which pictorially describes the format contemplated, according to the preferred embodiment of the invention, on a given employee's card.

Figure 2:
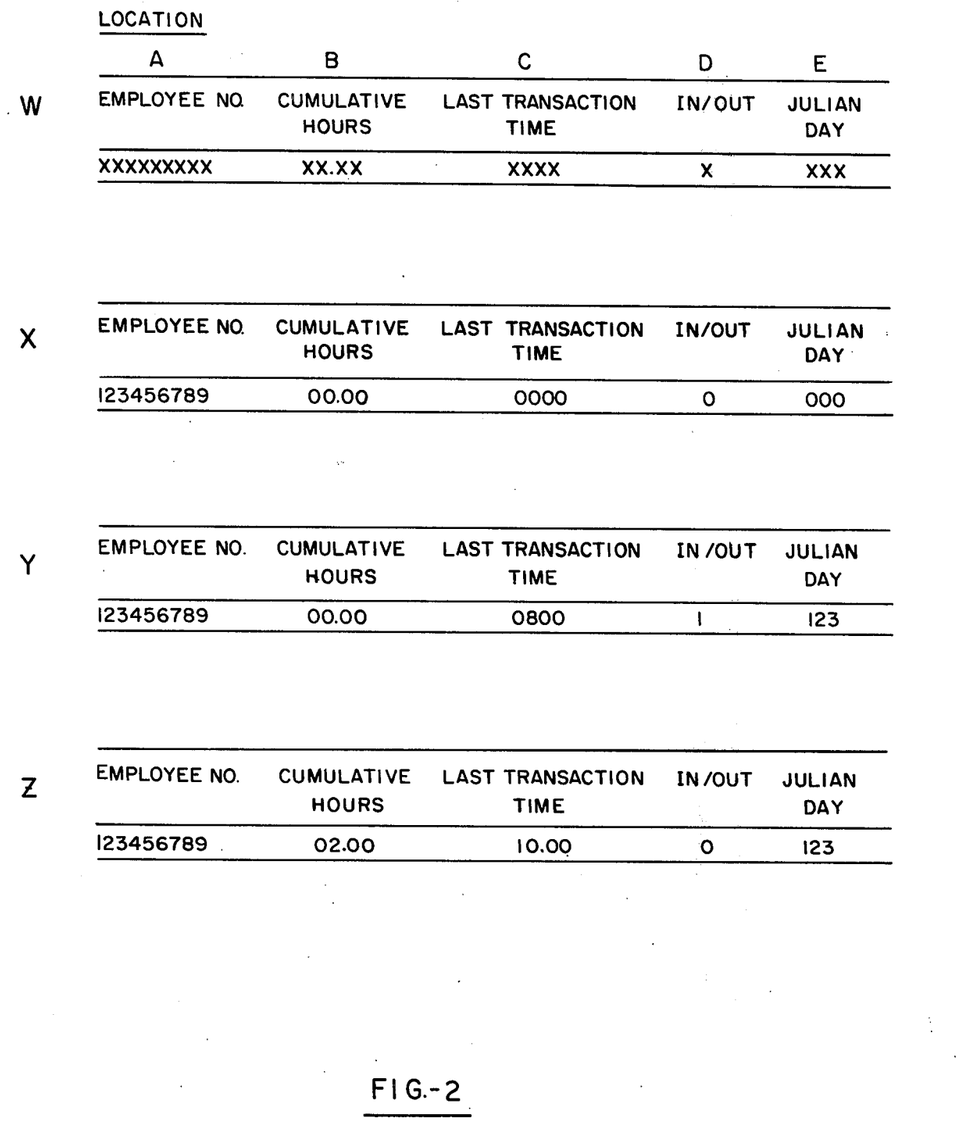
FIG. 2 displays an illustrative format for a magnetic-striped card suitable for use in conjunction with the system displayed in FIG. 1A and FIG. 1B.

It should be noted from FIG. 2 that the information entities to be stored on the card, i.e., employee identification number, cumulative hours, last transaction time, nature of the last transaction (in or out) and the day of the transaction, correspond to the BCD character fields allocated in registers 106 and 107 of FIG. 1A.

As an example of how the card may be utilized, consider the following with reference to line W of FIG. 2. Line W displays space for a nine-digit employee identification number, along with space for four digits indicating cumulative hours worked (with hundredths of hours being the least significant digit), four digits for indicating last transaction time, space for an input/output digit, indicating the nature of the last transaction, and space for three digits for indicating the Julian day of the last transaction.

Suppose an employee with nine-digit indentification number 123456789 enters on the first day of the pay period, the 123rd day of the year, at 8:00 in the morning and clocks in. Prior to his clocking in, the data on the credit card looks like the information depicted in line X of FIG. 2. After clocking in, the data on his card will look like line Y of FIG. 2. Assuming the empolyee decides to leave at 10:00 in the morning of the same day and clocks out, the employee's data would be modified by the apparatus set forth in FIG. 1A and FIG. 1B to look like line Z of FIG. 2 on the employee's card. The modification takes place as follows.

The employee first inserts his card in badge reader/recorder 101. The employee then depresses the in button shown on panel 123 of FIG. 1B.

The pushbutton depression will start the head travel mechanism in unit 101. Simultaneously, control 121 will initialize register 106 and 107, via control links 186 and 187 respectively. The initialization merely comprises clearing the registers. Address counter 113 is also initalized via control 121 and link 184 to point to the leftmost 4-bit character field of register 106 (ID field).

The tones are then serially read off the card by unit 101 and sent to receiver 103 via link 151, amplifier 102 and link 152.

At receiver 103, as each tone is received, a pulse is sent to control 121, via link 180 in the manner described hereinbefore, where a total of the number of characters input during this transaction is being maintained.

According to the illustrative example, the 1 of the identification number 123456789 would first be detected at receiver 103. This would cause the one link of 153-1 through 153-16, uniquely associated with the character 1, to become energized. In turn, BCD encoder 104 would cause a four-bit BCD character (in the first instance in the example the character 1) to be generated. The generated BCD character would then be stored at the location pointed to by address counter 113. The character would also be output to print buffer 105A. Upon receipt of an "end of message" character from the card, printer 105B will be activated and print buffer 105A. Print buffer 105A itself detects the BCD character representation of an end of message.

According to the illustrative example, the character 1 of identification number 123456789 would be stored in BCD in the leftmost 4-bits of register 106 via link 154, bus 155, and link 159. The character 1 would also be eventually output to printer 105B via link 154, bus 155, link 156, print buffer 105A and link 157.

Upon storage of the character in the location pointed to by address counter 113, counter 113 would be updated to point to the next four-bit character field and so on down the line until all data from the card is stored in registers 106 and 107 along with a print-out of the data from the card appearing on printer 105B. Thus, the employee may at this point view a record of his status at the time of the current transaction, i.e., how many hours worked to this point. Incidentally, the employee by viewing the printer may visually verify the information last recorded on his time card.

The receipt of the End of Message (EOM) character in addition to activating the printer as described above, informs control 121, via control link 180, that the input from the card is complete.

Control 121 will next test the accumulated digit count to see if the expected number of input digits has been received from the card. If not, an error condition is recognized. The details of all error responses will be set out hereinafter; however, at this point a description of normal flow-through operations will continue.

Assuming then that the expected number of digits has been received from the card, control 121 will next check the IOM field of register 106 to determine if the nature of the last transaction recorded on the card was an in or out transaction. If an in transaction was last recorded, another error, according to the illustrative example, would be recognized, since an in transaction is in progress. An in transaction followed by another in transaction is defined to be illegal. Again, the error would be indicated in a manner to be described hereinafter.

Assuming the last transaction was the opposite of the one now being performed, a check will then be made by control 121 to see if the administrative terminal, unit 124 is being utilized instead of card input before processing continues. Control 121 will be able to detect if terminal 124 is on or off by a signal generated on link 182 whenever the key is inserted.

As indicated above, administrative terminal 124 may be used to reissue cards, etc., and it is assumed for the time being that it is off-line so that the discussion of the in function may continue. The discussion of what happens when the administrative terminal is in use will be set out hereinafter.

Continuing with in function processing, all the characters appearing on the magnetic strip are now assumed to be in registers 106 and 107. If all of the checks referred to above indicate a normal processing sequence, then control 121 will set address counter 113 to point to the most significant character of the time field located in register 107 (i.e., the leftmost 4-bits of register 107).

Upon setting address counter 113 to point to this field, the clock/calendar unit, unit 118, will be enabled by control 121, via link 181 to serially output the time and date, most significant character of time first, on links 175-1 through 175-10. The time and date will be encoded in BCD by encoder 120 which will in turn output BCD characters, corresponding to the time and date, to register 107 for storage. This output will occur via links 177, bus 161 and link 163. Address counter 113 is incremented as each character of time and date is generated so that the proper character is stored in the proper field of register 107.

As each character is generated a digit count will be accumulated at control 121 via signals input on control link 183. This digit counting procedure has been explained hereinbefore. Acccording to the preferred embodiment, the time is, as indicated above, four digits (16-bits) long and the date is three digits (12-bits) long. Thus, according to the preferred embodiment, control 121 will shut clock/calendar 118 off via link 181 when all seven time and date digits have been input to storage register 107.

Upon storage of all seven digits, control 121 causes the IOF field of register 106 to be set to the BCD representation for the character 1 indicating the nature of this transaction to be an in transaction.

Next, the processing is suspended until the head of badge reader/recorder 101 has traveled to the end of the employee's card (past the end of message mark). Upon reaching the end of card, the head will reverse direction in preparation for data to be written onto the magnetic strip. The switching of the function (read to write) of badge reader/recorder 101 is performed via control 121 over control link 200.

Registers 106 and 107 now contain the time and date of the entry (8:00 A.M. on day 123 according to the illustrative example), along with the previously stored and unmodified ID number and cumulative hours worked information. The address counter is left pointing to the least significant date character at the end of time and date storage operation discussed above. Register 106 also contains an indication that, according to the illustrative example, this transaction is an in transaction.

As the head is traveling back over the card, the date, time, IOF field, "sigma field" and the ID field of registers 106 and 107 are output to both the card and cassette recorder 116 in the following manner. Recall address counter 113 is still pointing at the end of message character in register 107 (i.e. at the last character read into storage). The first character that has to be generated is the end of message character followed by the least significant date character, etc. until all characters have been output from registers 107 and 106 in the reverse order in which they were input. Each character is output serially to write register 109. Data from registers 107 and 106 is output to write register 109 via ink 160, bus 155, link 158 and, with reference to FIG. 3, link 397 and "AND" gate 323. Gate 323 is under the control of control 121, as indicated in FIG. 3, via control link 190. As gate 323 is enabled, the character appearing on link 158 is passed to link 167. Link 167 is a direct input link to write register 109 of FIG. 1B.

Each character serially sent to write register 109 is decoded by BCD decoder 110. A one-of-12 code is generated by decoder 110 corresponding to the 12 possible characters which may be written, according to the preferred embodiment, on the employee's card. This code is sent to oscillator driver control unit 111. Unit 111 in turn causes DTMF generator 112 to generate a tone uniquely corresponding to the character stored in write register 109. The generated tone is then output via links 171, 172, amplifier 115 and link 173 for optional recordation of cassette unit 116. Simultaneously, the tone is also sent via link 171, amplifier 117, and link 174 to badge reader/recorder 101 for recording on the magnetic strip as the head is traveling back towards the original position it was in when the card was first inserted.

The output (or "write") process continues, with address counter 113 being decremented as each character is read out, until add the data in register 107, and then register 106, has been output to the cassette recorder and the strip on the employee's card.

When the contents of address counter 113, as monitored by control 121, indicates that the last character has been output, the verification read portion of the in function commences.

The verification read is started by the reversal of the head so that it starts traveling in its original direction (direction traveled during initial input sequence).

The verification read proceeds as follows. Each digit is serially read off the card and encoded into the BCD in the same manner as described above for the initial input sequence. As each digit is encoded, it is output from the BCD encoder 104 via link 154 and directed, via control 121, to comparator 314 shown in FIG. 3 via links 158 and 396. The other comparator 314 input comes from registers 106 and 107 via links 165, gate 304, and link 360A (all shown in FIG. 3), for register 106; and via link 166, gate 304, and link 360A, for register 107. Each serially input character from the card is compared at comparator 314 with the corresponding stored character in register 106 or 107. If all the characters were recorded properly, gate 315, controlled by control unit 121 via control link 201, will prevent an error indication from being output on control link 199. In the event of a recording error, the card will be released and an error will be recognized by control 121 (via control link 199). As indicated above, all error recognition action will be discussed hereinafter.

Assuming no recordation error, the head direction will once again be reversed and the card will be released signifying the end of the transaction.

The release of the card in the normal sense takes place only after all the characters on the card and those in storage have been compared favorably, indicating the end "normal" in processing sequence, and after the characters as read in during the verification process are output on printer 105B showing the employee the new contents of his card.

The discussion shall now continue with reference to error handling.

Error conditions may be signaled by control 121 by the lighting of certain lights on status panel 122 corresponding to the error detected. In the case of improper transaction, i.e. two ins or two outs being attempted in sequence, an "improper transaction" light should be lit on status panel 122 and the card should be released. If an error in recording has taken place, as detected during the verification read process described above, the "improper recording" light should be lit on status panel 122 and the card should again be promptly released. If either of the two conditions referred to above materialize, the employee should try to repeat his transaction. Repeated failures should be reported to the employee's superior or the empolyee may utilize another terminal.

Finally, if the administrative terminal, unit 124, is enabled the decimal values of the switches on the terminal (0 through 9) are to be encoded serially by BCD encoder 120. The switch values are to be serially input to encoder 120 via link 125 and links 175-1 through 175-10. The encoding is to proceed, under control unit 121, until the digital value set on each switch is stored in the proper locations of registers 106 and 107, i.e., ID set number set on administrative terminal 124 should be stored in the ID field of register 106 etc. Via this mechanism a new card, modified card, etc. may be generated whenever it is desired by the company in case of loss, stolen or damaged cards by merely writing the manually input data onto the magnetic strip of a fresh employee card.

This completes the description of IN function processing. At this point, the data on the card, according to the illustrative example, has been transformed to appear as the data in line Y of FIG. 2.

Assuming now that the employee who has clocked in at 8:00 decides to leave at 10:00 that same morning, thus having worked a period of 2 hours. The following sequence of operations, denominated as out transaction processing will take place in order to transform the card from the way it appears in line Y of FIG. 2 to the way it appears in line Z of FIG. 2.

Figure 3:
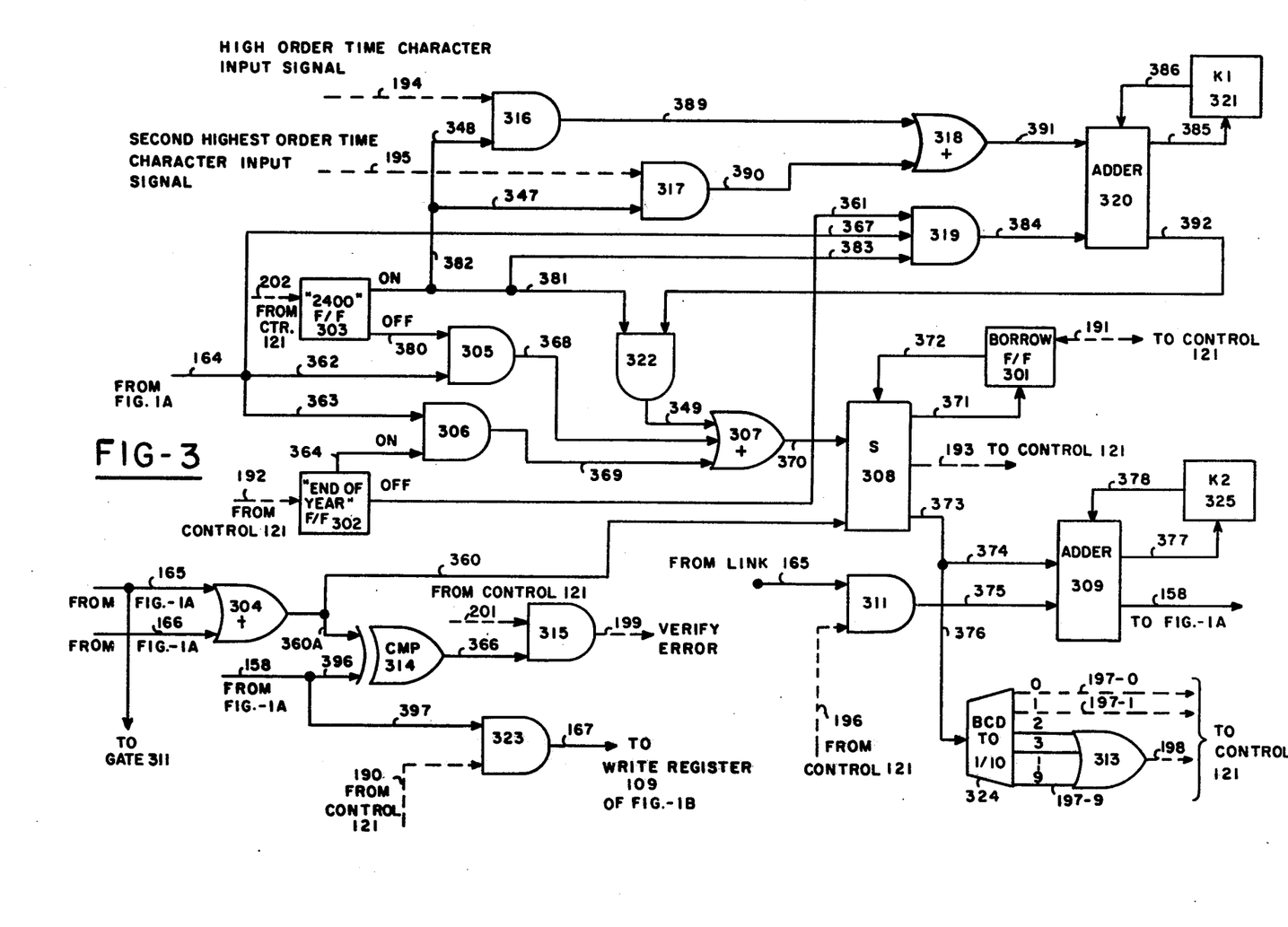
FIG. 3 displays the details of the arithmetic-logic unit (ALU) of FIG. 1A.

The following discussion of out function processing should be made with reference to FIG. 3.

FIG. 3 depicts the details of ALU 108, which serves to perform the following basic flexible time functions. (1) Computing the elapsed time between the last in and a current out transaction; (2) Adding this elapsed time to the total time accumulated on the employee's card to provide an update cumulative time figure; (3) Accommodating cumulative time processing where the employee arrives on one day and leaves the next day; and (4) Checking for boundary conditions such as end of year or excessive hours worked.

According to the preferred embodiment of the invention, working longer than 24 hours in one stretch is defined as an error.

A discussion of how the logic in FIG. 3 operates will now be set forth with reference to out transaction processing. To begin with out processing commences with the employee inserting his or her card into badge reader/recorder 101 and depressing the out button on unit 123. As with in processing, the digits are serially read off the card and encoded into BCD, stored in registers 106 and 107. Control 121 then resets borrow flip-flop 301 (via link 191), end of year flip-flop 302 (via link 192), and "2400" flip-flop 303 (via link 202), all of FIG. 3. By "resetting" this implies link 372 is forced low, link 364 is forced low, link 381 is forced low while links 380 and 361 are forced high. Address counter 113 (shown in FIG. 1A) is initialized at this time as well to point to the high order "date" character in register 107.

The first operation performed by ALU 108 is a test for the end-of-the-year boundary condition. In order to determine if an end-of-year boundary has been passed between the time an employee enters and leaves, ALU 108 will substract from the current clock/calendar generated numerical value of date (day of the out transaction) the date value stored in register 107 (date of the in transaction). Since a difference of other than 0 or 1 (i.e., 2 or more days) is nominally defined above as an error condition, no problem conditions arise as a result of normal processing (i.e., processing taking place in less than a 2-day span) unless the end of the year (day 365) is the day the employee entered and day number 1 (the first day of the new year) is the day he leaves. The problem arises in this case since 1 minus 365 does not equal 0 or 1 and implies an error condition when in fact there is none. Hence, the "End-of-Year" test is made as the first ALU function whenever the out button is depressed and before normal processing takes place.

To perform the end-of-year test, digits (in the form of BCD characters) are input to subtraction unit 308 on link 360, from register 107, via links 166, and OR gate 304. As each stored character of the date is input to subtraction unit 308, the corresonding date character generated by clock calendar 118 is input to subtractor 308 via link 370. The clock-generated date characters are gated to subtractor 308 via links 164, 362, AND gate 305, link 368, OR gate 307 and finally link 370.

Each character of the current date and stored date (low order character first) is substracted in the form, (current date character) - (stored date character). So long as the end of the year has not been reached, the differencing operation never requires a borrow when the third date character (high order date character) is subtracted. However, if the end of year has been reached, a borrow must occur to perform the subtraction of the high order date characters. In this case, subtractor 308 will set borrow flip-flow 301, via link 371, the borrow enabled occurs by link 372 going high.

Control 121 continuously strobes borrow flip-flop 301 via control link 191 and if the borrow flip-flop is set during the third subtraction, i.e., high order character subtraction, then control 121 sets end-of-year flip-flop 302 via control link 192.

If upon completion of the end-of-year test, flip-flop 302 is not set, then gate 306 will never be enabled and will have no further part in the processing sequence with respect to computing elapsed and cumulative time for the given transaction. However, if end-of-year flip-flop 302 is enabled, the description to follow with reference to the check for employees who work crossing a midnight boundary will indicate how enabled gate 306 is used in the processing sequence.

Recall that the employee cannot cross two midnight hours without clocking out or an error will be generated. This, according to the preferred embodiment, is not a limitation but rather a design feature to inform supervision of employees who are working unreasonably long hours.

After the end-of-year test, ALU 108 processing continues by testing to see if the employee entered before midnight on one day and is leaving on the next day.

To test for an in before midnight and an out after midnight, control 121 first sets address counter 113 to the time and date field in register 107. The borrow flip-flop, unit 301, is reset and again a character-by-character subtraction of corresponding stored and clock-generated date digits (characters actually) is performed. If the low order date character results in a difference of 1 (recall again the result must be 1 or 0 or else an error has occurred) then the "2400" flip-flop, unit 303, is set, i.e., link 381 is forced high while link 380 is forced low.

If the difference of the low order date digit (stored) subtracted from the clock-generated date digit is greater than 1 or if the difference of the other stored digits of the date and their corresponding clock-generated date digit differ from 0, an error would be implied and an error transaction light is to be lit by control 121 of status panel 122. The value obtained upon subtraction at subtractor 308 is indicated to control 121 via links 373, 376, decoder 324 and control link 197-0, 197-1, . . . , 197-9. OR gate 313 will send an error sign to control 121 via control link 198 whenever the subtraction differs from 0 or 1.

The purpose of having end-of-year flip-flop 302 may now be appreciated. The crossing of the end-of-year boundary will always cause "2400" flip-flop 303 to be set upon the subtraction of the lower order date digits as explained above. As soon as "2400" flip-flop 303 is set, then gate 305 would become inhibited and in order to check the high order digits of the date for an error condition (recall end of year is NOT an error condition), an access path to subtractor 308 must be provided for characters coming from the clock. The access path is provided via gate 306 which is enabled by end-of-year flip-flop 302 during the remainder of the "midnight crossing" processing sequence. So long as end-of-year flip-flop 302 is set, the output of subtractor 308 will go directly to control 121, via control link 193. Control 121 will directly monitor the differencing result from the high order digits of the date in the end-of-year situation to determine if an error condition is to be signaled.

Upon performing the subtraction of the three-digit characters (performed serially), if no error has occurred, ALU 108 processing continues by first resetting end-of-year flip-flop 302 and then proceeding to calculate the elapsed time in the following manner.

Before going on to explain how elapsed time is calculated, it should first be noted that the setting of the "2400" flip-flop, unit 303, serves one basic function; that function is to have the numerical value of the current time incremented by 24 hours in order to facilitate subtracting the stored time characters and get a positive resultant elapsed time.

Two conditions are possible at this point. The first condition is that the "2400" flip-flop has not been set, e.g., as in the illustrative example where the clocking in and clocking out are both on the same day (8:00 A. M. and 10:00 A. M. the same morning). The other possible condition is that the "2400" flip-flop has been set as a result of an initial determination by ALU 108 that a midnight boundary has been crossed, (the details of how ALU 108 can make such a determination are described hereinbefore). The first condition, i.e., with the "2400" flip-flop not being set, thereby resulting in link 380 being high, will be explored first.

The first step in the elapsed time and cumulative time calculation process with the unit 303 reset condition is to initialize address counter 114 of FIG. 1A to point to the low order cumulative time character in register 106. Since gate 305 is enabled, the time characters from clock/calendar 118 will arrive one at a time at subtraction unit 308 (low order character first) via links 164, 362, gate 305, link 368, gate 307 and finally link 370. The corresponding time characters from register 107 will arrive at subtraction unit 308 via link 116, gate 304 and finally via link 360.

The elapsed time is computed one character at a time, and as a given character difference is output from subtractor unit 308, it is transmitted to adder 309, via links 373 and 374. Each difference character is then summed with its corresponding cumulative time character (sent to adder 309 via link 165, AND gate 311, and link 375 under the control of control 121 exercised over control link 196). By "corresponding cumulative time character" it is meant that the low order cumulative time character (hundredths of an hour) is added first to low order elapsed time character (output from subtractor unit 308), etc., until all four elapsed time characters and the cumulative time characters of the same order of magnitude have been summed.

After each summation, each resultant character (four of which will comprise the new cumulative time figure) in BCD format), is sent via link 158 (from adder 309) to the sigma field in register 106. A given output character is stored in the location of the sigma field pointed to by pointer 114. Pointer 114 is updated after each store to provide the next cumulative time character to ALU 108 for summation with the next computed (subtractor 308 output) elapsed time character.

This process continues until all of the four new cumulative time characters have been computed and stored in register 106.

In the alternative case, where the "2400" flip-flop has been set, the process is identical to that described above for computing new elapsed time characters for storage in register 106 with the exception that the current time input to subtractor 308 will be first incremented by 24 hours. In order to do this, and thereby prevent a negative number from resulting when computing elapsed time, the current clock/calendar generated time characters are routed via links 164 and 367 to the 24-hour compensation logic comprised of gates 316, 317, 318, 319 and 322, adder 320, flip-flop (carry flip-flop) 321, links 381, 382, 383, 384, 385, 386, 389, 390, 391, 392, 347, 348, 349, and control links 194 and 195.

The two low-order time characters are serially passed to adder 320 via gate 319 (enabled since flip-flop 303 is now presumed set and end-of-year flip-flop 302 has been reset thereby providing enabling inputs to gate 319 on links 383 and 367 respectively). Adder 320 is only operative to modify a character if link 391 is enabled which will result when one of the two high-order date characters are input via link 384. Control 121 will signal the input of the high-order characters by causing one of links 194 or 195 to become energized. Link 194 is energized whenever the highest order time character is input on link 384 and link 195 is energized whenever the second highest order time character is input on link 384. The two low-order time characters will thus pass unmodified to subtractor 308, via links 392, gate 322, link 349, OR gate 307 and link 370.

Whenever one of the two high-order time characters is supplied to adder 320, the adder will modify the input character (on link 384) as follows.

The second highest order time character is modified to represent a digit whose value is four greater than the digit represented by the character as input, and the highest order time character is modified to represent a digit whose value is two greater than the digit represented by the high order character as input. Thus, in effect, the input time from the clock/calendar is incremented by 24 hours.

The modified high-order characters are serially sent to subtractor unit 308 via links 392, gate 322, link 349, gate 307 and link 307. Unit 308 will again compute the elapsed time and cumulative time in a manner described above when the "2400" flip-flop is not set.

What has been described with reference primarily to FIG. 3 are the details of an arithmetic and logic unit suitable for use in accordance with the preferred embodiment of the invention. As the result of the ALU processing so described, a modified cumulative time figure results in register 106 awaiting output to the employee's card and cassette unit 116 of FIG. 1A. Outputting the data from registers 106 and 107 to the employee's card is the next processsng step. This is initiated when control 121 recognizes the completion of the ALU processing phase (indicated when address counter 114 indicates the entire sigma field has been filled with updated characters).

The balance of processing is identical to the writing process described hereinbefore with reference to in processing, with the result of the "write processing" being a modified strip on the employee's card corresponding to what may be seen, according to the illustrative example, in line Z of FIG. 2.

Next, a verification read of the modified card is performed, according to the preferred embodiment, in precisely the same manner as the verification read described above for in processing. Printer 105B also is activated during verification read and displays the information shown on line Z of FIG. 2, thereby providing the employee with the visual feedback as to where he stands with respect to his work obligation for the pay period upon making this particular out transaction.

Once again, the presence of any of the possible error conditions described above will result in a light on status panel 122 being lit by control 121. In such a case, the employee is to either retry the transaction or report the malfunction to his supervisor.

What has been described above, with reference to an illustrative example, are the details of the time recordation system and associated ALU logic for supporting a flexible time scheduling operation.

It should be understood that the invention has been described with reference to this particular illustrative embodiment and that many of the details used to facilitate the description of such a particular embodiment are chosen for convenience only and without limitations on the scope of the invention. For example, more than 12 output characters may be generated according to the needs of a particular user. In such case, the DTMF generator would simply be modified to generate the appropriate number of distinct dual-tone combinations. A further example of an alternative embodiment would involve the recording and extracting of digital characters directly without dual-tone coding and decoding.

Still further examples of additional embodiments and features include:

1. a system that can automatically subtract a fixed amount of time for a lunch period. The subtraction would be done, for example, if the elapsed time was greater than 9 hours for a 1 hour lunch period or 8.5 hours for a half-hour lunch;

2. a system that would accumulate overtime. In such a system all time in excess of a pre-defined time, normally 8 hours, would be separately recorded and/or displayed;

3. finally, a system that would allow for job data to be entered manually via a keyboard. Job data could thus be stored along with elapsed time data on, for example, a cassette. The cassette could then be subsequently processed to obtain data related to each job according to any desired data reduction technique.

Many other embodiments may be devised by those skilled in the art without departing from the scope or spirit of the invention. Accordingly, the invention is intended to be limited only by the scope and spirit of the appended claims.

What is claimed is:

1. In a time recordation system for recording data related to successive uses of said system,
    a portable recording medium having data recording areas permitting recording of data related to the last use of the system,
    switchable means operative in a first mode to extract data from said recording medium,
    logic means responsive to first data extracted from said recording medium by said switchable means for calculating the time difference between first and second uses of said system to thereby generate elapsed time data representing a measure of the elapsed time between said first and second uses, and to use said elapsed time data and second data extracted from said recording medium to generate modified data representing current cumulative elapsed time,
    said switchable means being operative in a second mode to record said modified data upon said recording medium and
    visual display means for displaying said cumulative elapsed data at the time of each use of the system.

2. A time recordation as defined in claim 1 further comprising a backup recording medium for providing a copy of all information output to said portable recording medium.

3. A method for calculating, on an individual basis, elapsed time between an individual's first and second use of a time recordation system, for cumulating individual elapsed time for successive uses of said system and for recording said cumulative elapsed time on a portable recording medium comprising the steps of
    a. extracting data from said portable recording medium,
    b. using said data to calculate, in a first mode, the time difference between said first and second uses of said system to thereby generate first data representing a measure of elapsed time,
    c. using said first data and further data extracted from said recording medium to calculate, in a second mode, a measure of cumulative elapsed time for successive uses of the system to provide second data, and
    d. recording said second data on said portable recording medium.

4. A method of cumulating elapsed time as defined in claim 3 further comprising the step of:
    a. displaying said modified data at the time of each use of said system.

5. A method of cumulating elapsed time as defined in claim 3 which, whenever the data stored on said portable recording medium is in the form of dual tone multifrequency signals further comprises the steps of
    a. translating said extracted data from dual tone multifrequency signals to binary-coded signals prior to entering said second mode, and
    b. translating at least the modified data derived in said second mode to dual tone multifrequency signals prior to recording said modified data on said portable medium.

6. In a time recordation system for recording data related to hours worked by an employee over a preselected time period
    a portable recording medium having data recording areas for recording data including transaction data for indicating entry and exit transactions, time data, and cumulative elapsed time data representing the previous total number of hours worked over said time period,
    switchable means, with which said recording medium may be placed in physical association, operative in a first mode to extract the data recorded on said recording medium, operative in a second mode to record data on said medium,
    storage means for storing the extracted data,
    control means responsive to stored transaction data for initiating a first control sequence whenever said transaction data indicates an entry transaction and for initiating a second control sequence whenever said transaction data indicates an exit transaction, and
    processing means controlled by said control means in accordance with the first control sequence initiated by said control means to provide modified time data to said switchable means for recording on said recording medium for use in the next exit transaction, said processing means being controlled by said control means in accordance with said second control sequence for using the time data for computing the elapsed time between the last entry and the current exit to provide elapsed time data, and for using said elapsed time data and the stored cumulative elapsed time data in providing modified data, representing cumulative hours worked, to said switchable means for recording on said recording medium.

7. A time recordation system as in claim 6 wherein said portable recording medium comprises a magnetic strip affixed to a card.

8. A time recordation system as in claim 7 further comprising means for displaying said modified data at the completion of each entry and exit transaction.

9. A time recordation system as defined in claim 8 further comprising a backup recording medium physically associated with said processing means for providing a copy of all information output to said magnetic strip.

10. A time recordation system as defined in claim 6 wherein the extracted data is in the form of dual tone multifrequency signals and wherein said processing means further comprises means for translating dual tone multifrequency signals into binary-coded logic level signals, said storage means being connected to said translation means for storing said binary-coded logic level signals, arithmetic/logic means connected to said storage means for performing arithmetic and logical operation on said logic level signals in order to provide modified binary-coded logic level signals for further use in the calculation of said modified data, said arithmetic/logic means being further operative to cause said modified logic level signals to be stored in said storage means, and output means connected to said storage means for translating said modified logic level signals into dual tone multifrequency signals for output to said switchable means whenever said switchable means is operable in said second mode.

11. A time recordation system as defined in claim 10 which further comprises means for displaying said modified data at the completion of each entry and exit transaction.

12. A time recordation system as defined in claim 10 which further comprises a backup recording medium physically associated with said processing means for providing a copy of all information output to said portable recording medium.

13. A method of cumulating elapsed time for an individual's successive uses of a time recordation system for recording on a portable recording medium comprising the steps of
   a. extracting data related to the last use of the system from said medium,
   b. selecting a first mode of processing whenever the individual is entering a work facility,
   c. selecting a second mode of processing whenever the individual is leaving a work facility,
   d. initiating a first control sequence whenever said first mode is selected,
   e. initiating a second control sequence whenever said second mode is selected,
   f. processing said extracted data whenever said second sequence is initiated to provide further data representing elapsed time between the last entry of the work facility and the current exit from the work facility and using said further data and said extracted data in obtaining data representing cumulative elapsed time for successive uses of the system, and
   g. recording the modified data on said medium for use in obtaining further modified data at the time of the next exit from said work facility.

14. A method of cumulating elapsed time as defined in claim 13 further comprising the step of
   a. displaying data representing cumulative elapsed time extracted from said recording medium at the completion of said first mode of processing, and displaying the modified data representing the cumulative elapsed time at the completion of said second mode of processing.

15. A method of cumulating elapsed time as defined in claim 13 further comprising the step of
   a. recording said processed data on a backup recording medium.

16. A method of cumulating elapsed time as defined in claim 15 which, whenever the data stored on the said portable recording medium is in the form of dual tone multifrequency signals further comprises the steps of
   a. translating said dual tone multifrequency signals to binary-coded signals,
   b. computing cumulative elapsed time by operating on said binary-coded signals to generate a modified binary-coded signals,
   c. translating said modified binary-coded signals to dual tone multifrequency signals for storage on said recording medium.

17. In a time recordation system for recording data related to hours worked by an employee over a pre-selected time period, a portable recording medium having a first recording area for recording transaction data for indicating entry and exit transactions, a second recording area for recording cumulative elapsed time data representing the previous number of hours worked during said pre-selected time, and a third recording area for recording time data indicating the time of the last transaction, switchable means with which said recording medium may be placed in physical association, and operative in a first mode to extract data from said recording medium, storage means for storing the extracted data, control means for initiating an entry transaction control sequence whenever said transaction data indicates an entry transaction, and for initiating an exit transaction control sequence whenever said transaction data indicates an exit transaction, timing means for providing reference data representing the current time, and processing means controlled by said control means to be operable when said exit transaction control sequence is initiated to subtract said time data from said reference data to provide elapsed time data representing the time difference between the last entry transaction and the current exit transaction, and to add said elapsed time data to said cumulative elapsed time data to provide modified data representing the current total number of hours worked, said switchable means being operative in a second mode to record said modified data on said recording medium in said third area.

18. A time recordation system as defined in claim 17 wherein said recording medium comprises a magnetic strip affixed to a card permitting reuse of said first, second and third recording areas with each transaction, said control means effecting modification of the transaction data recorded in said first area and the time data recorded in said second area at the end of the control sequence for each transaction.

* * * * *